Figure 1:
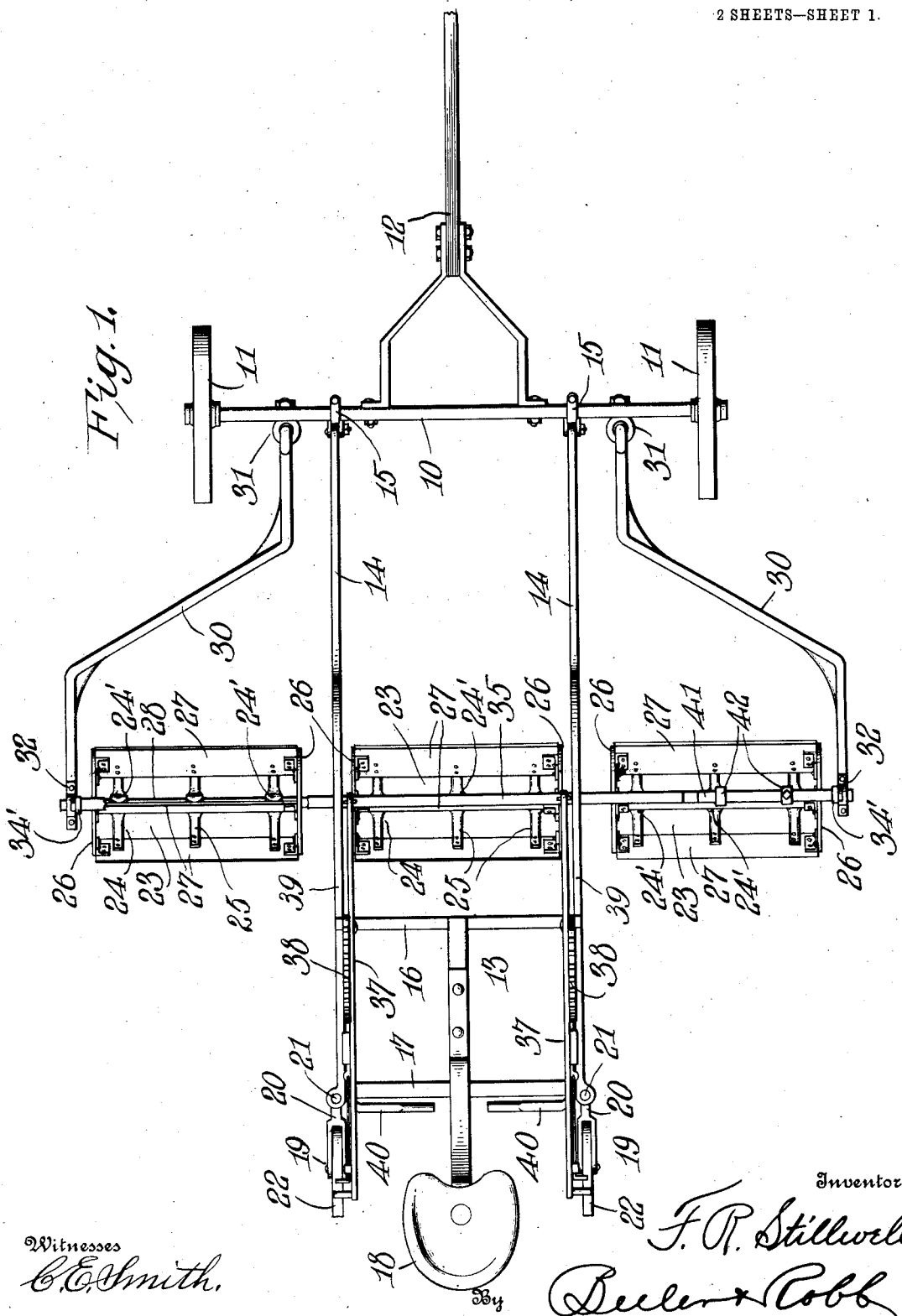

F. R. STILLWELL.
STALK CUTTER.
APPLICATION FILED MAR. 28, 1908.

905,947.

Patented Dec. 8, 1908.

2 SHEETS—SHEET 1.

Witnesses
C. E. Smith.
S. E. Dodge.

Inventor
F. R. Stillwell,
By Beeler & Cobb
Attorneys

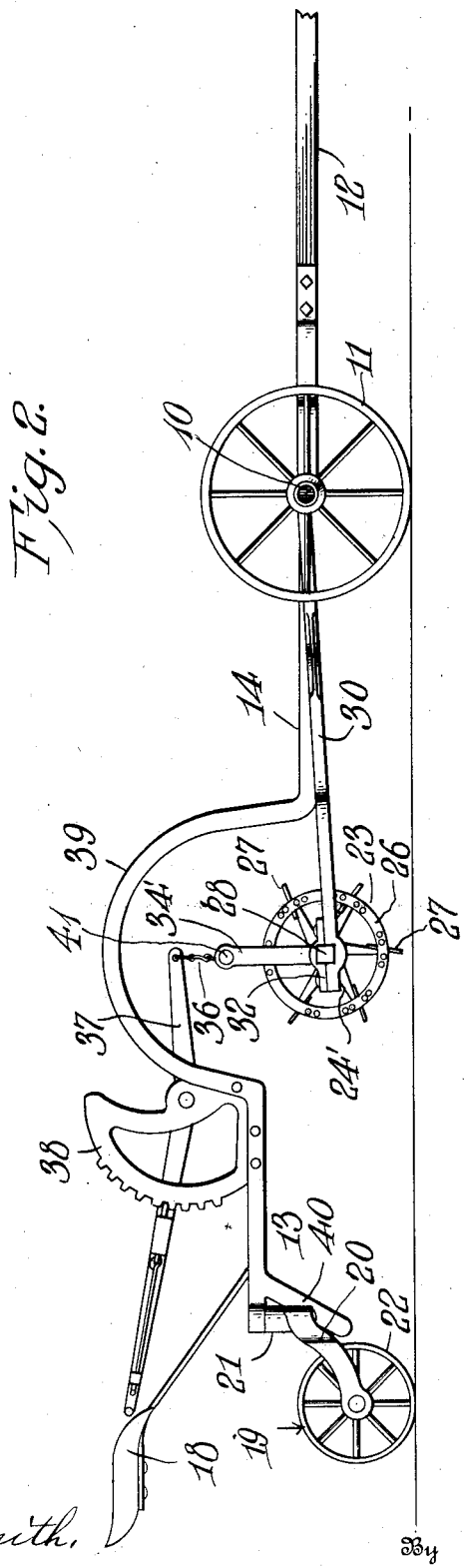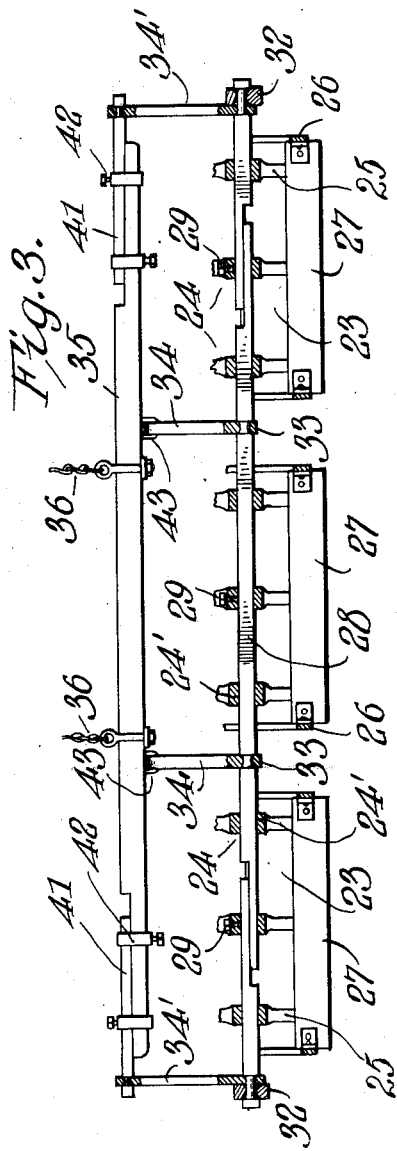

UNITED STATES PATENT OFFICE.

FRANK R. STILLWELL, OF LOTT, TEXAS.

STALK-CUTTER.

No. 905,947.  Specification of Letters Patent.  Patented Dec. 8, 1908.

Application filed March 28, 1908. Serial No. 423,876.

*To all whom it may concern:*

Be it known that I, FRANK R. STILLWELL, a citizen of the United States, residing at Lott, in the county of Falls and State of Texas, have invented certain new and useful Improvements in Stalk-Cutters, of which the following is a specification.

This invention relates to that class of agricultural implements known as stalk cutters or choppers, and has particular reference to certain specific improvements in such machinery whereby the same are better adapted for various requirements and also whereby the machines may be built at a comparatively low cost without detracting materially from their efficiency.

More specifically stated the present invention contemplates the provision of a structure of the class specified which shall be more effectively and satisfactorily adjusted as to width than has heretofore been accomplished, and the invention includes certain other details, all of which will be fully hereinafter set forth and illustrated in the accompanying drawings, in which, Figure 1 is a plan view of the entire machine; Fig. 2 is a side elevation of the same, and Fig. 3 is a detail view of certain parts to be hereinafter described.

Throughout the following description and on the several figures of the drawings similar parts are referred to by like reference characters.

Referring specifically to the drawings, the numeral 10 indicates the main or front axle having at its ends ground wheels 11, and to which axle is secured any suitable type of tongue 12 by means of which the machine will be drawn by the use of two or four horses in actual use.

13 indicates a frame of general rectangular form in plan view, and comprising two main bars 14 constituting the sides of said frame and connected pivotally with the axle 10 by means of clips 15. Near the rear ends of the bars 14 are rigidly secured cross beams 16 and 17 which serve to properly brace and space the said bars 14 and also to serve as a support for the driver's seat 18. The frame 13 is supported at its rear end by means of casters 19 each of which includes a frame or yoke 20 having a vertical axis journaled in an eye or box 21 at the rear end of the corresponding side bar 14, the wheel 22 of each caster being journaled in said yoke 20. Thus far described the frame 13 will follow the axle 10 in all its movements swinging laterally as the axle or truck turns, as in turning the machine at the ends of the rows, the casters permitting lateral movement of the rear end of the frame without altering the angularity of the frame with respect to the front axle 10.

The machine is provided with any suitable number of rotary cutters 23, herein indicated as three for the purpose of cutting or chopping three rows at one time. These cutters 23, being all alike, a specific description of one will be understood as applying to all. The cutter comprises a plurality of spiders 24, shown as three in number, and each provided with a hub 24' having a polygonal hole therethrough and a plurality of arms 25 radiating therefrom. At each end of the cutter is a ring 26 and extending between said rings and secured thereto and also secured to the arms 25 are a plurality of cutting blades 27. The shaft 28, having a form throughout its main portion corresponding to the polygonal holes of the hubs 24', constitutes the main supporting means for all of the cutters 23 whereby they are held in proper operative relation to the main part of the machine. The shaft 28 is illustrated as being square in cross section corresponding to the holes 24, but it will be understood that the exact form of the same may be varied if desired. Each hub 24' is provided with a set screw 29 whereby the same is caused to be locked to the shaft 28. By this means the cutter 23 is secured in proper position upon the shaft 28. As is well known corn is planted in rows of varying widths in different parts of the country and also depending upon the character of the soil in any particular locality. For this reason it is desirable to provide means whereby the cutters may be adjusted so as to readily adapt them for cutting a plurality of rows of different widths and yet so that each cutter will receive its row substantially centrally. By providing a polygonal shaft as herein set forth and securing the cutters thereto by means stated such longitudinal adjustment of the cutters with respect to the shaft 28 may be accomplished in a very easy and effective manner. Ordinarily after once assembled the central cutter will remain in adjusted position but the outer cutters will be adjusted toward the central cutter if the corn rows to be chopped are closer together, or the end cutters may be adjusted outwardly from the center if the rows are wider apart.

In order to connect the cutter bar 28 or shaft, with the cutters 23 secured thereto, to the front axle 10 there are provided bars 30 having loose pivotal connection at their front ends to eyes 31 and having journal boxes 32 at their rear ends in which the ends of the cutter bar or shaft 28 are journaled, the shaft 28 rotating in such boxes 32. The pivotal connection between the bars 30 and the axle 10 permits a sufficient amount of freedom of movement of the cutter bar 28 vertically as would be necessary in operating the machine over uneven ground. The shaft 28 in addition to being rounded at the boxes 32 is also provided with cylindrical portions 33 for the purpose of receiving upright links 34 and 34' connected at their upper ends to a bar 35. The said bar 35 has connection by means of flexible connecting members 36, shown as chains, with hand levers 37, pivoted at some suitable fixed point on the frame 13. The levers 37 operate in substantially vertical planes and include locking bolts which coöperate with toothed segments 38 rigidly secured on said frame 13, the handles of said levers being in convenient reach of the operator of the machine when seated upon the seat 18. When turning the machine or during transportation of the same the operator will lift the cutter bar with its cutters by means of the levers 37 so that the cutting blades 27 will be entirely free from the ground. The flexible connections 36 will permit slight vertical movement of the cutters during ordinary operation of the machine even though the levers 37 may have fixed positions with respect to the segments 38 at such time. Each of the bars 14 is provided with an upwardly curved intermediate portion 39 in order to permit the necessary vertical movement of the cutters. The frame 13 will also have secured thereto by any suitable means foot rests 40.

In some instances it may be desirable to shorten the shaft 28 in order to decrease the entire width of the machine in accordance with the aforesaid adjustment of the outer cutters for the accommodation of narrow rows of corn. If the machine is set for narrow rows and it is desirable that no unnecessary length of shaft project laterally beyond the outer cutters the shaft 28 may be made in sections, as illustrated in Fig. 3, the outer sections overlapping the ends of the inner section, and such overlapped ends being preferably in position to be embraced by one of the hubs 24'. By this means the hub 24' will constitute a clamp for effectively binding such shaft parts together, and inasmuch as each cutter 23, as a whole, is a rigid structure, the three hubs 24' of such cutter being connected as will be described to the shaft 28 will constitute an exceedingly rigid support for the divided shaft, even though the shaft is extended to correspond with the outward adjustment of the cutters for cutting wider rows. When the shaft 28 is made in sections as described it will be desirable also to provide extension means for the beam 35. As a suitable illustration of such construction there is indicated at each end of said bar 35 a rod 41 adjustably secured to said bar by means of clips 42. The outermost members 34' will be connected to the outer ends of the rods 41, and the intermediate members 34 may have connection below the bar 35 as indicated at 43.

While there is herein set forth a suitable embodiment of the present invention, it will be understood that slight details of construction may be varied without departing from the spirit of the invention hereinafter claimed.

Having thus described the invention, what is claimed as new, is:

1. The hereindescribed stalk cutter comprising, in combination, a main truck, a rectangular rigid frame connected with said truck, rotary supporting means for the rear end of said rectangular frame, the intermediate portion of the frame being upwardly curved, a polygonal shaft disposed transversely with respect to said frame and within the curved portion thereof, bars journaled to the ends of said shaft and having pivotal connection at their front ends with said truck, a plurality of cutters having hubs corresponding to the shape of the shaft and mounted thereon, means for adjustably securing said cutters at various positions with respect to one another on said shaft, and means mounted upon the frame aforesaid and connected to said cutter shaft for lifting the same with its cutters vertically within the arched portion of said frame.

2. The combination of a main axle, a rectangular frame secured to said axle, the intermediate portion of said frame being upwardly curved, a cutter shaft located in the rear of said axle and substantially within the curved portion of the frame, the greater portion of said cutter shaft being polygonal in cross section, a plurality of cutters adjustably secured upon said cutter shaft, and means secured on said rectangular frame for elevating said cutter shaft with its cutters, said means including a transverse bar parallel to the said cutter shaft and connections between said bar and said cutter shaft, substantially as set forth.

3. The combination of a main axle, a rectangular frame secured to said axle, the intermediate portion of said frame being upwardly curved, a cutter shaft located in the rear of said axle and substantially within the curved portion of the frame, the greater portion of said cutter shaft being polygonal in cross section, a plurality of cutters adjustably secured upon said cutter shaft, and means for lifting and holding the cutter bar with its cutters in elevated position comprising a transverse bar, a plurality of substantially vertical members secured to said bar, and in whose lower ends the said cutter bar is journaled, a plurality of levers journaled upon said frame, and flexible connections between said levers and the bar aforesaid.

In testimony whereof I affix my signature in presence of two witnesses.

FRANK R. STILLWELL.

Witnesses:
W. H. WORSHAM,
A. C. HENKE.